INVENTOR
B. O. ZEINETZ

Dec. 20, 1966 B. O. ZEINETZ 3,292,316
SELF-SUPPORTING ROOF

Filed Sept. 26, 1961 5 Sheets-Sheet 2

INVENTOR
B. O. ZEINETZ

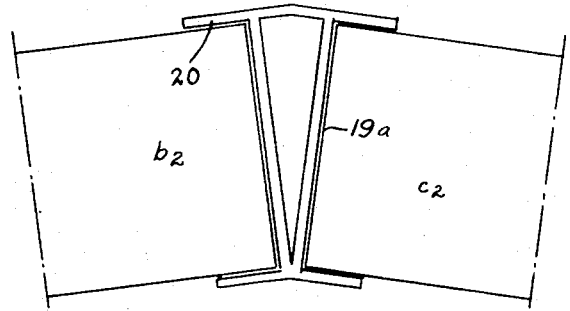
FIG. 12   A–A
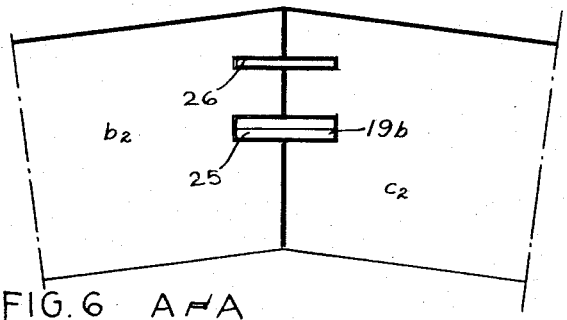
FIG. 6   A–A
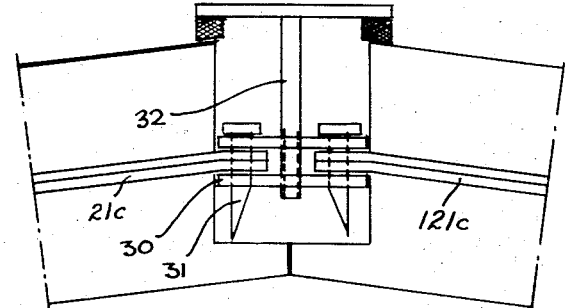
FIG. 8   B–B
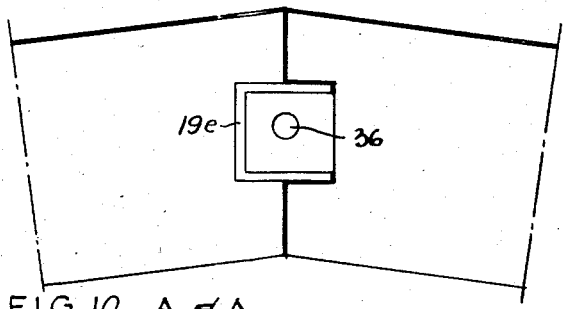
FIG. 10   A–A Dec. 20, 1966  B. O. ZEINETZ  3,292,316
SELF-SUPPORTING ROOF
Filed Sept. 26, 1961  5 Sheets-Sheet 5
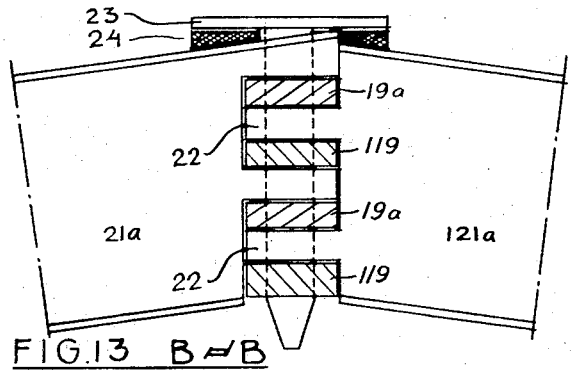
FIG.13  B-B
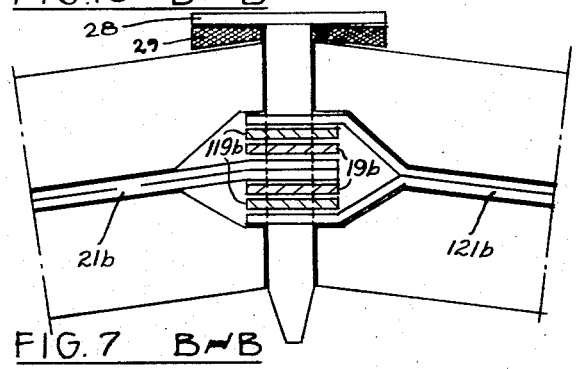
FIG.7  B-B
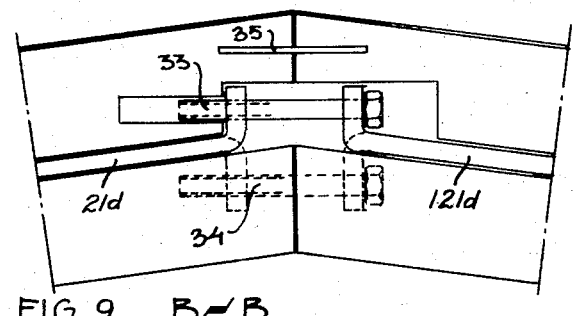
FIG.9  B-B
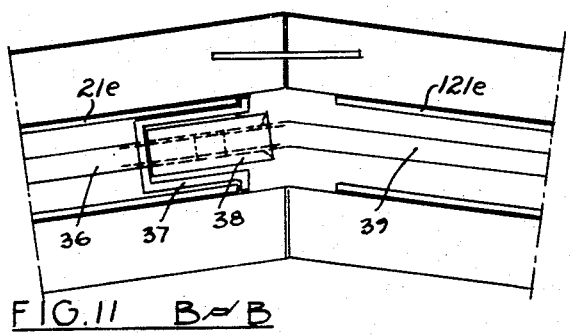
FIG.11  B-B
INVENTOR
B. O. ZEINETZ
BY
ATTORNEY United States Patent Office 3,292,316
Patented Dec. 20, 1966

3,292,316
SELF-SUPPORTING ROOF
Bertil Olov Zeinetz, 7 Storgatan, Stockholm, Sweden
Filed Sept. 26, 1961, Ser. No. 140,788
Claims priority, application Sweden, Oct. 1, 1960,
9,389/60; Mar. 23, 1961, 3,104/61
12 Claims. (Cl. 52—81)

The invention relates to roofs of buildings.

More particularly, this invention relates to self-supporting building roofs of the shell, cupola or vault types.

Still more particularly my invention relates to roof structures for larger spans which are nearest comparable with the shell structures of the type erected for example by the well-known Italian Luigi Nervi or the lattice-work cupolas erected by the American Buck Fuller and others.

The known lattice-work cupola is built up of bars and junctions often disposed in various geometrical patterns. Said frame is subsequently at the place of erection covered with protecting and insulating material which work often must be done highly above the ground and which, in order to be performed with a minimum of risk, calls for erection of high scaffolds or stagings.

The shell structures of Nervi, which are of concrete, have generally been moulded at the place of erection which requires a very extensive shaping work. In some cases said structures have been mounted in the form of a prefabricated frame, and the covering and insulating roof material has been mounted at the place of erection under the same unfavourable conditions as are experienced in the erection of the lattice-work cupolas.

One main object of the present invention is to provide a system for erecting self-supporting shell, cupola, and vault roofs which comports many marked advantages over the prior art.

Another object of the invention is to provide a roof construction consisting of elements constituting both the supporting frame and the covering roof surface and the insulation. This construction has the advantage that the whole roof structure can be manufactured in a finished shape at a plant whereby the production is highly simplified and the costs thereof are considerably reduced. A further advantage is that the complicated erection of scaffolds or stagings at the place of erection is almost completely avoided.

A further object of the invention is to provide roof elements formed so as by part-engaging one another to impart to the structure sufficient strength for taking up irregularly divided loads.

A still further object of the invention is to provide a structure which when applied to cupola roofs makes elements already mounted to constitute a support for additional elements whereby the valuable advantage is obtained that no stagings need to be erected for the following mounting operation.

Still a further object of the invention is to provide roof elements for buildings the entire covering surface of the roof structure of which can be used for taking up crushing stresses produced by the own weight of the roof and additional loads accumulated thereon.

Further objects and advantages of the invention will become apparent from the following description, considered in connection with the accompanying drawings which form part of this specification and of which:

FIG. 5 is a diagrammatic top view of a part of a roof constructed according to the invention from a plurality of adjacent interconnected elements. FIGS. 6, 10 and 12 are sections following lines A—A, and FIGS. 7, 8, 9 and 11 are sections following lines B—B in FIG. 5 and represent various coupling means for abutting elements.

Figure 1:
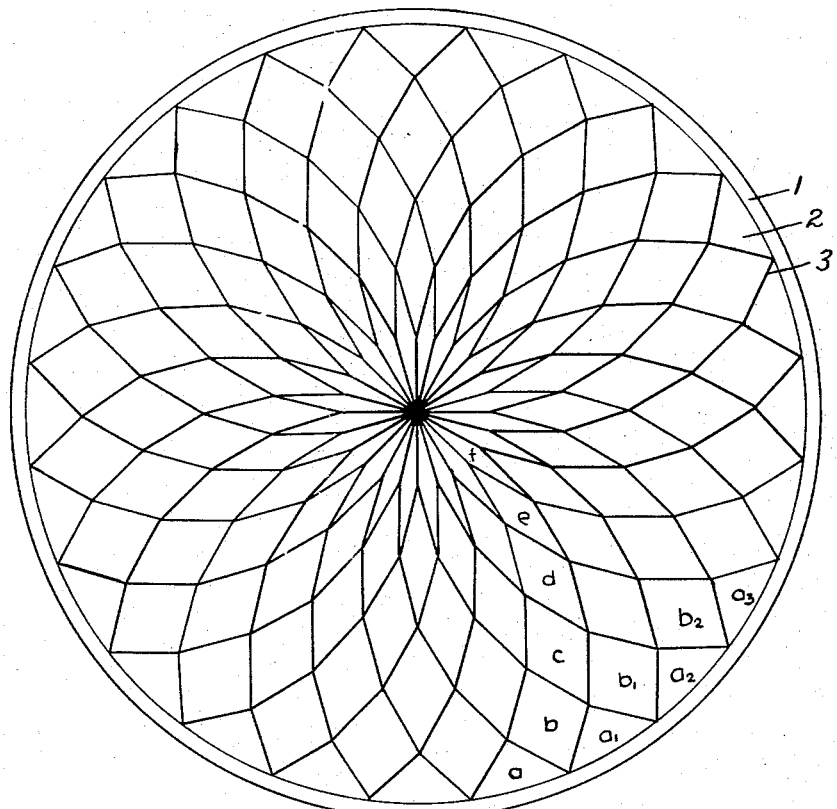
FIGS. 1 and 3 are top views of roofs constructed according to the invention.

Referring to the drawings, FIG. 1 is a top view of a building constructed according to the invention when finally erected. The building has a roof comprising an angular edge frame 1 limiting a cupola-formed shell composed of a plurality of elements 2 meeting one another in joints 3. The elements 2 are disposed in different series denoted by $a$, $b$, $c$, $d$, $e$ and $f$. The elements in the same series are preferably identical as is indicated in FIGURE 1 by index numbers such as $a_1$, $a_2$, $a_3$, $b_1$, $b_2$, etc.

Figure 2:
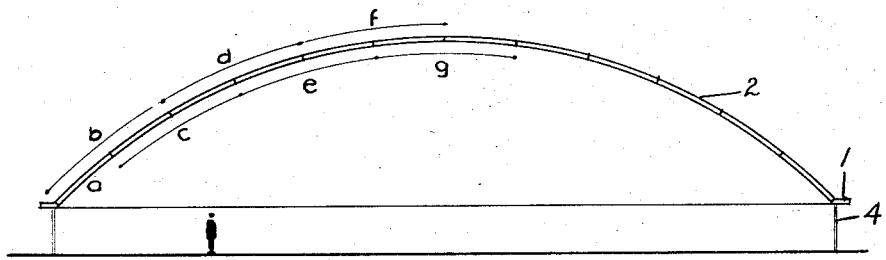
FIGS. 2 and 4 are vertical sections through the roofs shown in FIGS. 1 and 3 respectively.

In a vertical section the building preferably is formed as is shown in FIG. 2. In the example shown in said figure the edge frame 1 rests on columns 4. It may also rest on base structures of other shape or directly on the ground. The figure also indicates how the elements in the various series project past one another so as to impart desired good structural strength to the finished shell.

The building with its roof is preferably erected in the following manner. The columns 4 are raised. On said columns the edge frame is placed. Said frame may consist of several part elements. If desired the edge frame may be provided additionally with an annular girder adapted to take up the horizontal component of the compressive force resulting from the load acting on, and the own weight of the cupola roof.

The first series of elements denoted by $a$ may have a triangular form and is secured to the edge frame by means of a suitable coupling device. The following series of elements $b$ may have a rhombic form. One element of said series $b$ is secured between two elements of the series $a$ by wedging one projecting tongue thereof between two elements of the series $a$ and is kept in position by means of a suitable coupling device which will be described more in detail later in this specification. The entire series of elements $b$ when mounted finally forms together with the elements of the series $a$ an annular shell structure capable of taking up horizontally acting compressive forces which renders the shell self-supporting and thus makes scaffolds or staging unnecessary.

The series of elements $c$ is mounted in a similar manner as the series of elements $b$. Together with the series $a$ and $b$ the series $c$ forms a self-supporting shell. Remaining series of elements denoted by $d$, $e$, and $f$, are mounted in a corresponding manner until the whole shell is finished. If desired, the last series or the last two or three ones may be replaced by a minor cupola or like member adapted to admit light into the interior of the cupola.

Figure 3:
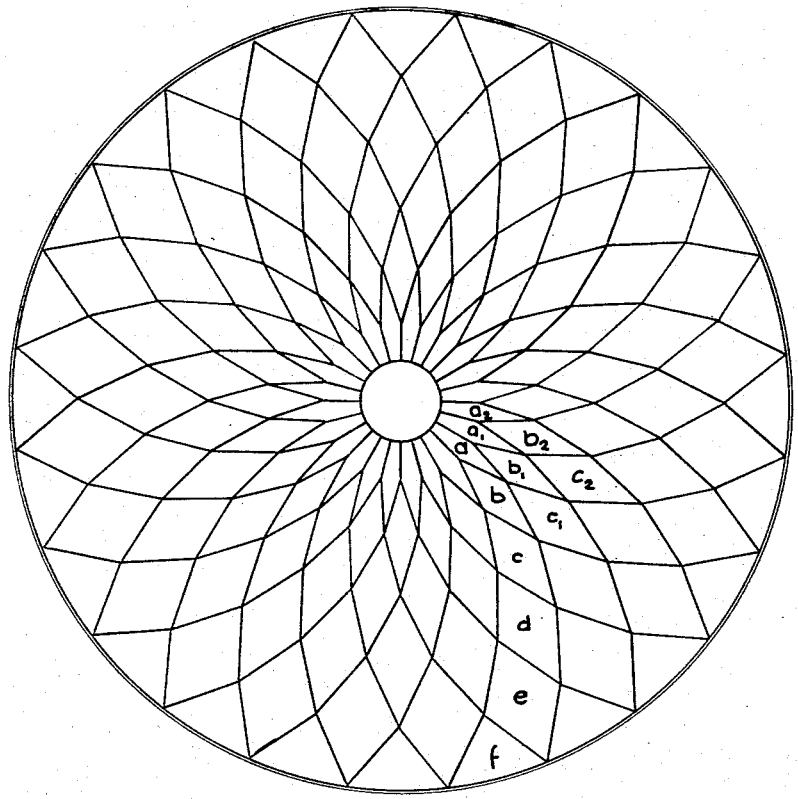

FIG. 3 shows a funnel-shaped building constructed according to the invention. This embodiment of the invention may be mounted on a tubular base 5. The first series of elements $a$ is mounted on the top of said tubular base. The subsequent series of elements $b$, $c$, $d$, $e$ and $f$ are mounted in a similar manner as in the embodiment shown in FIGS. 1 and 2. The erection is finished by stretching an annular girder 6 around said series $f$ of elements which girder is destined to produce the horizontally acting force keeping the shell together.

Figure 4:
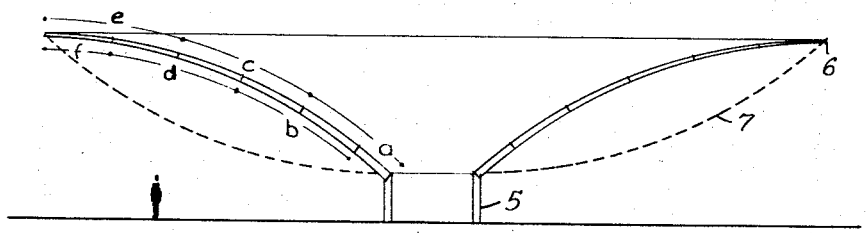

The funnel-shaped building may according to an alternative embodiment be curved in another manner as is indicated in FIGURE 4 by dashed line 7.

Figure 5:
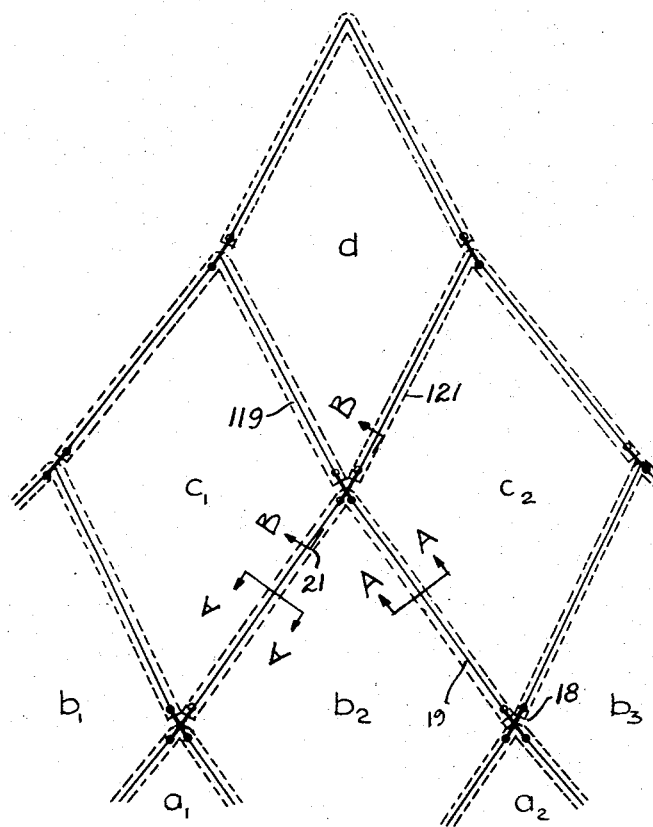
FIG. 5 is an elevational view of groups of adjacent elements forming part of a roof according to the invention, and individually shaped differently.

A shell-formed building embodying the invention may be made of elements formed in various manners. One example is shown in FIG. 5. The elements, some of which are represented and denoted by $b_1$, $c_1$, $c_2$ and $d_1$ respectively, have the form of rhomb-shaped slabs abutting edge to edge.

FIG. 5 is an elevational view of several elements kept together adjacent one another by means of coupling devices indicated generally by reference numeral 18. The elements are formed along their lateral edge portions with unbroken profile members 19, 119, 21 and 121 adapted to fit the abutting lateral edge portions of adjacent elements. When assembling these elements, the edges of an adjacent element are inserted into the profile member of the element or elements already mounted so that in the finished roof the elements are mutually connected along rows of interengaging profiles which keep each element in wedged engagement with the adjacent elements and prevents them from being forced out of engagement when the building is subjected, for example, to the attack of winds exerting a sucking effect on the roof. The rows of interengaging profile members also render possible the prestressing of the shell of the cupola.

FIG. 12 is an example of a joint between two adjacent elements based on a profile member 19a having H shape. The flanges 20 of the profile member 19a prevent the elements $b_2$ and $c_2$ from becoming displaced upwards or downwards in relation to one another.

FIG. 13 shows a joint between adjacent elements formed with profile members in H shape indicated by reference numerals 19a, 21a, 119a, and 121a. The free ends of the profiles are formed with projections 22 having each an aperture of identical diameter and a common axis. In assembled position of the elements a pin 23 is inserted through said apertures and locks the projections of the adjacent elements profiles rigidly to one another. A seal of the joint may be obtained by means of a packing 24. The pin may have its free end formed conically to render possible subjecting the elements to some prestress during the assembling operation.

FIG. 6 is an example of a joint between two adjacent elements consisting of a notch 25 formed in the abutting edge sides of said adjacent elements and in which is placed a strip 19b. The joint may be sealed by means of a packing 26 having the form of a ribbon or a T.

FIG. 7 is another view of the strip 19b at its juncture with similar strips 119b, 21b and 121b. At the point where the strips cross one another (see also FIG. 5) they are formed with apertures having identical diameter and a common axis. In the assembling operation a pin 28 is inserted through the apertures in all strips, and the joint is sealed by means of a packing 29. The free end of the pin may be made conical which renders possible subjecting the elements to prestress.

FIG. 8 shows another embodiment of the locking of a strip-shaped seam. In the embodiment shown in FIG. 8 a washer 30 is provided with so many holes as there are strips such as 19c, 119c, 21c and 121c to be connected there. In the assembling operation wedged members 31 are inserted through the holes in the washer and corresponding holes in the strips which wedged members exert a tension on the strips and unite them together through the washer. Said washer may also have a threaded aperture to allow a threaded bolt 32 with a disc-shaped head to be threaded thereinto to seal the opening necessary for introduction of the wedged members 31.

FIG. 9 illustrates a third example of a locking device for strips located in notches in the panel element edges. In the embodiment shown the strips 21d and 121d of adjacent elements are bent off at their opposite ends and joined together by means of a bolting 33. The bolting joint may also be turned downwards as is indicated by dotted lines 34. A disc 35 entering into grooves formed in both abutting elements may serve as a seal.

FIG. 10 shows an example of a U-shaped seam 19e. It is also possible to use a tubular member. A U-shaped or a tubular seam may have a tension bar 36 running through its center.

FIG. 11 shows a locking means for use in connection with a U-shaped or tubular seam 19e, 119e, 21e and 121e. In the embodiment shown, the tension bar 36 is stretched by means of a device 37 bearing on the notch. A stretching member and tubular nut 38 may be used, said nut receiving also the free end of the tension bar 39 of the adjacent element.

The panels may be solid slabs of some suitable material such as glass, wood, synthetic plastic, or moldable materials such as concrete, porous concrete, foamed plastic, foamed glass, or the like. Panels may also be formed of several different materials. It may for example be composed of an uppermost moisture-insulating layer made of cardboard, sheet metal and the like, thereunder a heat insulating layer consisting of, for example, wood wool, cork, porous concrete and like material, followed by a load sustaining layer made of concrete, for example, and lowermost a sound absorbing layer consisting of, for example, a fiber board provided on its free face with non-penetrating holes. Also on its lowermost flat side the element may be provided with a moisture impermeable sheet. The different materials are suitably bound together by cohesion produced by a moulding operation.

While several more or less specific embodiments of the invention have been shown and described, it is to be understood that this is for purpose of illustration only and that the invention is not to be limited thereby, but its scope is to be determined by the appended claims.

What I claim is:
1. A self-supporting roof for a building having the form of
   (a) a curved shell formed of a plurality of panel elements arranged to form a generally curved surface,
   (b) tension members associated with each panel element interconnecting several points spaced about each panel element,
   (c) means interconnecting the individual panel elements with the tension members for compressing the individual panel elements when the tension members surrounding the panel elements are connected and drawn together, and
   (d) means to place the said tension members under tension and to interconnect them with tension members of adjacent panels, whereby the tension members compressed the individual panel elements and join them together.

2. The structure of claim 1 in which
   (a) the panel elements are polygonal in shape and are arranged with their sides adjacent corresponding sides of adjacent panel elements, and
   (b) a tension member is located along each side of the polygonal panel elements and between the elements.

3. The structure of claim 1 in which the means to interconnect the tension members is a unitary structure engaging with three tension members, two of which are associated with different panel elements and one of which is common to two of the panel elements.

4. The structure of claim 1 in which the said coupling means include means for placing the tension members under gradually increasing tension.

5. The structure of claim 1 in which opposite ends of the tension members have apertures therein, and the coupling means includes a pin fitted in the apertures of a plurality of tension members meeting at a corner of a panel element.

6. The structure of claim 5 in which a portion of the pin is of wedge shape.

7. The structure of claim 1 in which the tension members are of H shape and the edges of panel elements fit between the flanges of the H-shaped tension members.

8. The structure of claim 1 in which the panel elements have notches in their lateral edges and the tension members are mounted within the said notches.

9. The structure of claim 1 in which the coupling means includes a threaded member.

10. The structure of claim 1 in which the tension members comprise a rod member and a hollow member surrounding the rod.

11. The structure of claim 1 in which
(a) the curved shell comprises a dome like structure including a circular edge frame of angular shape defining the base of the dome, a plurality of triangular panel elements having their respective bases fitted within the angular portions of the circular edge frame and their apexes extending inwardly along the surface of the dome, a row of diamond shaped panel elements fitted in the dome surface by insertion of the angle of one diamond shaped element between each triangle element and other rows of diamond shaped panel elements arranged to form the dome surface with an apex of each diamond inserted between two other diamond elements of the preceding row,
(b) the tension members comprise beam members, each being positioned in the dome surface and adjacent the side of a diamond shaped element and being shaped to interengage with the panel element on each side of it, and
(c) the means to place the tension members under tension comprising apertures in the ends of each tension member overlapping apertures of tension members intersecting at the apexes of the diamond shaped elements, and pins having conical ends inserted within each set of overlapping apertures and positioned substantially perpendicular to the dome surface.

12. A self-supporting roof structure comprising
(a) a plurality of panel elements arranged to form a shell like surface,
(b) tension members running between points spaced about the periphery of each panel element,
(c) means interconnecting the individual panel elements with the tension members for compressing the individual panel elements when the tension members surrounding the panel elements are connected and drawn together, and
(d) means to couple the ends of the tension members to other tension members to
(1) place tension on the tension members,
(2) place the panel elements under compression, and
(3) interconnect the various panel elements to form a unitary roof structure.

References Cited by the Examiner
UNITED STATES PATENTS

| | | | |
|---|---|---|---|
| 1,877,898 | 9/1932 | Kotrbaty | 52—293 |
| 2,238,111 | 4/1941 | Hain | 52—227 X |
| 2,436,543 | 2/1948 | Blaski | 52—521 |
| 2,505,343 | 4/1950 | Stolz | 52—557 |
| 2,682,235 | 6/1954 | Fuller | 52—81 |
| 2,711,181 | 6/1955 | Woods | 52—80 X |
| 2,827,002 | 3/1958 | Weidlinger | 52—80 |
| 2,918,151 | 12/1959 | Kennedy | 52—588 |
| 2,944,370 | 7/1960 | Malarkey | 52—81 |
| 2,978,074 | 4/1961 | Schmidt | 52—81 |
| 3,026,651 | 3/1962 | Richter | 52—81 |
| 3,061,977 | 11/1962 | Schmidt | 52—81 |

FOREIGN PATENTS

| | | |
|---|---|---|
| 60,419 | 12/1942 | Denmark. |
| 465,876 | 5/1937 | Great Britain. |
| 1,818 | 2/1917 | Holland. |

OTHER REFERENCES

Architectural Forum, January 1957, page 136.

RICHARD W. COOKE, JR., *Primary Examiner.*

WILLIAM I. MUSHAKE, CORNELIUS D. ANGEL, JOEL REZNEK, *Examiners.*

J. L. RIDGILL, M. L. MINSK, *Assistant Examiners.*